US011789336B2

(12) United States Patent
Sun et al.

(10) Patent No.: US 11,789,336 B2
(45) Date of Patent: Oct. 17, 2023

(54) DEVICE FOR IMPROVING LASER WAVELENGTH CONVERSION EFFICIENCY AND HIGH-POWER MULTI-WAVELENGTH FIBER-FORMAT FEMTOSECOND LASER SYSTEM USING THE DEVICE

(71) Applicant: National Taiwan University, Taipei (TW)

(72) Inventors: Chi-Kuang Sun, Taipei (TW); Yang-Ting Hsiao, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 381 days.

(21) Appl. No.: 17/118,644

(22) Filed: Dec. 11, 2020

(65) Prior Publication Data

US 2022/0190544 A1 Jun. 16, 2022

(51) Int. Cl.
*G02F 1/383* (2006.01)
*G02F 1/35* (2006.01)
*G02F 1/37* (2006.01)
*H01S 3/00* (2006.01)

(52) U.S. Cl.
CPC ............ *G02F 1/383* (2013.01); *G02F 1/3513* (2013.01); *G02F 1/374* (2021.01); *H01S 3/0092* (2013.01)

(58) Field of Classification Search
CPC ................................. G02F 1/374; G02F 1/383
See application file for complete search history.

(56) References Cited

U.S. PATENT DOCUMENTS

| 7,403,688 B2* | 7/2008 | Knox | G02B 6/02347 385/125 |
| 8,556,824 B2* | 10/2013 | Xu | G02F 1/3513 606/15 |
| 9,063,299 B2* | 6/2015 | Shurgalin | G02B 6/3624 |
| 11,237,486 B2* | 2/2022 | Uebel | G03F 9/7065 |

(Continued)

OTHER PUBLICATIONS

Ming Che, Chan et al. (2008). 1.2- to 2.2mm Tunable Raman Soliton Source Based on a Cr : Forsterite Laser and a Photonic-Crystal Fiber. Photonics Technology Letters, IEEE. 20. 900-902. 10.1109/LPT.2008.922339. (Year: 2008).*

(Continued)

*Primary Examiner* — Rhonda S Peace
(74) *Attorney, Agent, or Firm* — Tomanageip Co., Ltd.

(57) ABSTRACT

This invention provides a device for improving laser wavelength conversion efficiency and a laser system configured to provide high-power multi-wavelength femtosecond laser pulses using the device. The device for improving laser wavelength conversion efficiency comprises a wavelength conversion member photonic crystal fiber (PCF), wherein the device for improving laser wavelength conversion efficiency improves wavelength conversion efficiency by shortening the length of the PCF. The device provided in this invention not only reduces the attenuation and dispersion caused by the optical fiber, but also improves the energy conversion efficiency within a specific wavelength range. The use of the technique not only increases the energy of light pulse, but also greatly reduces the amount of fiber used, and can maximize the energy of the desired wavelength according to experimental requirements when using laser input sources of different wavelengths.

5 Claims, 7 Drawing Sheets

(56) References Cited

U.S. PATENT DOCUMENTS

2014/0334763 A1* 11/2014 Holzer .................. G02F 1/3513
385/1
2021/0026255 A1* 1/2021 Uebel ................. G03F 7/70625
2022/0190544 A1* 6/2022 Sun ....................... H01S 3/0092

OTHER PUBLICATIONS

Chris Xu; Generation of energetic wavelength tunable femtosecond pulses in higher-order-mode fiber. AIP Conference Proceedings Oct. 1, 2008; 1055 (1): 6-7. https://doi.org/10.1063/1.3002547 (Year: 2008).*

* cited by examiner

DEVICE FOR IMPROVING LASER WAVELENGTH CONVERSION EFFICIENCY AND HIGH-POWER MULTI-WAVELENGTH FIBER-FORMAT FEMTOSECOND LASER SYSTEM USING THE DEVICE

FIELD OF THE INVENTION

The invention relates to the field of laser systems, in particular to a device for improving laser wavelength conversion efficiency and a high-power multi-wavelength fiber-format femtosecond laser system using the device.

BACKGROUND OF THE INVENTION

In the fields of nonlinear optical microscopic imaging, nonlinear optical microscopic spectral imaging, and plenoptic excitation and imaging of neuron networks, multi-wavelength high-energy ultra-short pulse laser light sources are required. In order to increase the energy of the output laser pulse, especially to increase the energy of Cherenkov radiation, a more intuitive method is to increase the output pulse energy by increasing the power of the input laser. However, the problem with this method is that when the input laser power is increased to increase the Cherenkov radiation energy, the wavelength of the output laser pulse will change with the input energy, resulting in the inability to obtain the desired wavelength under high-energy conditions. Therefore, there is an urgent need for a device for improving laser wavelength conversion efficiency, which increases the output pulse energy, while keeping the wavelength of the output laser pulse within the desired range.

Two-photon microscopy is one of the commonly used imaging methods for biological tissues, and has the advantages of deep penetration and high resolution. The input laser of the two-photon microscope should be with the characteristics of high pulse energy and short pulse duration. However, in order to excite multiple fluorescent proteins at the same time, the currently designed multi-wavelength laser systems have disadvantages such as high cost and complicated design. Therefore, there is an urgent need for a low-cost, simple-designed multi-wavelength laser system as light source of two-photon microscope.

In some multi-wavelength laser systems designed in prior art, in order to improve the energy conversion efficiency of Cherenkov radiation, long optical fibers or weak excitation sources were used. In other laser systems in prior art, the lights acquired by Cherenkov radiation were in the visible light band. None of the above laser systems are suitable for neuroscience microscopy or specific spectroscopy. If the length of fiber is too short, it is not easy to operate in most commercial instruments (fiber cleaver, fiber fusion splicing equipment, etc.). Therefore, the problem to be solved in this invention is to design a device for improving laser wavelength conversion efficiency, which increases the output pulse energy, while keeping the wavelength of the output laser pulse within the desired range; and by using the device for improving laser wavelength conversion efficiency, to design a multi-wavelength laser system with simpler components and lower cost using an optical fiber with a suitable length and price, which can make the light acquired by Cherenkov radiation near infrared light and improve the energy conversion efficiency. The laser system is suitable for multi-photon microscopes to obtain deep biological images.

SUMMARY OF THE INVENTION

The technical problem to be solved by the present invention is to provide a device for improving laser wavelength conversion efficiency, which increases the output pulse energy, while keeping the wavelength of the output laser pulse within the desired range; and by using the device for improving laser wavelength conversion efficiency, to design a multi-wavelength laser system with simpler components and lower cost using a fiber with a suitable length and piece, which can make the light acquired by Cherenkov radiation near infrared light. The light acquired by Cherenkov radiation can be applied to multiphoton or two-photon microscopes to obtain deep biological images.

In order to achieve the above-mentioned purpose of the invention, the present invention provides a device for improving laser wavelength conversion efficiency, wherein the device for improving laser wavelength conversion efficiency comprises a wavelength conversion member photonic crystal fiber (PCF), and improves wavelength conversion efficiency by shortening the length of the PCF.

Preferably, the length of the PCF $L_{PCF}$ is ≤1.25 cm.

Preferably, the length range of the PCF is 0.65 cm≤$L_{PCF}$≤1.25 cm.

Using the device for improving laser wavelength conversion efficiency of the present invention, by shortening the length of the optical fiber to increase the energy conversion efficiency, the length of the optical fiber is shortened to the centimeter scale, which not only reduces the attenuation and dispersion caused by the optical fiber, but also improves the energy conversion efficiency within a specific wavelength range.

The present invention also provides a laser system configured to provide high-power multi-wavelength femtosecond laser pulses, comprising a NIR laser, a first lens, a photonic crystal fiber (PCF) and a second lens, wherein: the NIR laser is used to generate laser pulses; the first lens is used for focusing the laser pulses generated by the NIR laser and coupling the laser pulses into the PCF; the PCF is used to broaden the wavelength window of the laser pulses transmitted inside it through Soliton self-frequency shift (SSFS) and Cherenkov radiation, and to obtain light in three different wavelength ranges; the length of the PCF $L_{PCF}$ is less than 1 cm; the second lens is used to convert the multi-wavelength light output from the PCF into parallel light, and to output the parallel light.

As a further improvement of the present invention, the NIR laser is a Yb-fiber laser with a center wavelength of 1070 nm.

As a further improvement of the present invention, the length range of the PCF is 0.65 cm≤$L_{PCF}$≤1.25 cm.

As a further improvement of the present invention, the wavelength range of Cherenkov radiation is 750-1000 nm, the wavelength range of the negative dispersion of laser pulses generated by the NIR laser at 1070 nm is 1000-1100 nm, and the wavelength range of SSFS is 1100-1400 nm.

As a further improvement of the present invention, the laser system further comprises a HWP and a PBS (polarizing beam splitter), wherein the HWP is used to adjust the polarization direction of the laser pulses generated by the NIR laser; and the PBS is used to allow p-polarized light transmitting and s-polarized light reflecting to achieve power regulation.

As a further improvement of the present invention, the laser system further comprises a band-pass filter, and the band-pass filter is used to filter the light output from the second lens to output light of specific wavelength window.

As a further improvement of the present invention, the laser system is used as an input light source of a two-photon microscope.

The high-power laser system in the present invention can be used in two-photon microscopes to image labeled tissues and biological cells. The laser light output from the laser system of the present invention has the characteristics of high energy conversion efficiency, high pulse energy and short pulse duration. In addition, the laser system has the following advantages. Firstly, the dispersion caused by the short fiber is weak, so the system can output ultra-short pulse laser (<100 fs) without additional components to compensate for dispersion. Secondly, the wavelength range of Cherenkov radiation can be controlled to be near-infrared, which facilitates the application of the system in multiphoton microscopes and make the microscopes easier to obtain deep biological images. Thirdly, fiber consumption can be significantly reduced by using short fiber in the laser system.

DETAILED DESCRIPTION OF THE INVENTION

Figure 1:
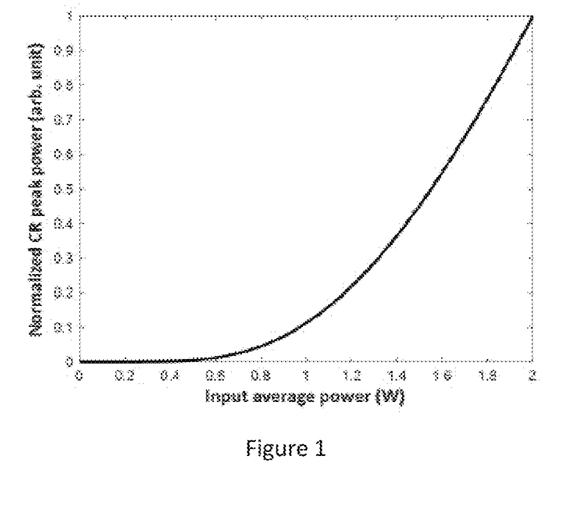
FIG. 1 is a graph showing the theoretical relation between incident powers and energy conversion efficiencies.

Referring to FIG. 1, FIG. 1 is a graph showing incident powers and energy conversion efficiencies, where the horizontal axis is the average power of incident laser, and the vertical axis is the peak power of Cherenkov radiation. It can be seen from FIG. 1 that when the average power of incident laser increases, the peak power of Cherenkov radiation will also increase, which means that the output power of Cherenkov radiation is also increasing. This is more intuitive that by increasing the energy of input laser, the output energy of Cherenkov radiation is increased. We can also draw this conclusion through theoretical derivation. Previous studies have shown that the relationship between Cherenkov radiation energy and incident laser energy is as shown in formula (1):

$$P_{CR} \approx P_0 \left(\frac{5\pi}{4\delta_3}\right)^2 \left[1 - \frac{2\pi}{5}(2N-1)\delta_3\right]^2 \exp\left[-\frac{\pi}{2(2N-1)\delta_3}\right] \quad (1)$$

where $P_{CR}$ is the peak power of Cherenkov radiation, $P_0$ is the peak power of incident laser, and N and $\delta_3$ in formula (1) can be expressed as formulas (2) and (3), respectively:

$$N = \sqrt{\frac{\gamma P_0 T_0^2}{|\beta_2|}} \quad (2)$$

$$\delta_3 = \frac{\beta_3}{6|\beta_2|T_0} \quad (3)$$

where $\delta_3$ is the normalized third-order dispersion (TOD), and N is the soliton order.

Although the energy of Cherenkov radiation will increase when the average energy of incident laser is increased, the wavelength conversion result of Cherenkov will also change. The wavelength conversion effect of Cherenkov can be shown in formula (4):

$$\sum_{m=2}^{\infty} \frac{\beta_m(\omega_p)}{m!}(\omega - \omega_p)^m = \frac{\gamma P_p}{2} \quad (4)$$

where $\omega - \omega_p$ is the difference between incident wavelength and soliton wavelength, and $P_p$ is the peak power of soliton. The terms related to soliton in formula (4) can be quantified as:

$$\omega_p = \frac{d\Delta v_R}{dz} = \frac{4T_R(\gamma P_0)^2}{15\pi|\beta_2|} \quad (5)$$

$$P_p = P_k = \frac{(2N+1-2k)^2}{N^2} P_0 \quad (6)$$

where $\Delta v_R$ is the difference between incident wavelength and soliton wavelength ($\omega - \omega_p$), $T_R$ is the Raman response function, and $P_k$ is the peak power of soliton of order k (k=1-N). The above formulas all show that when the incident energy increases, the wavelength and energy of soliton will both increase, which causes the wavelength of Cherenkov radiation to blue shift with the red shift of the soliton wavelength. It can be known from the above theory that when the energy of Cherenkov radiation is increased by increasing the power of incident laser, its wavelength will also change with the energy of incident laser, resulting in the inability to obtain the desired wavelength under high-energy conditions.

Figure 2:
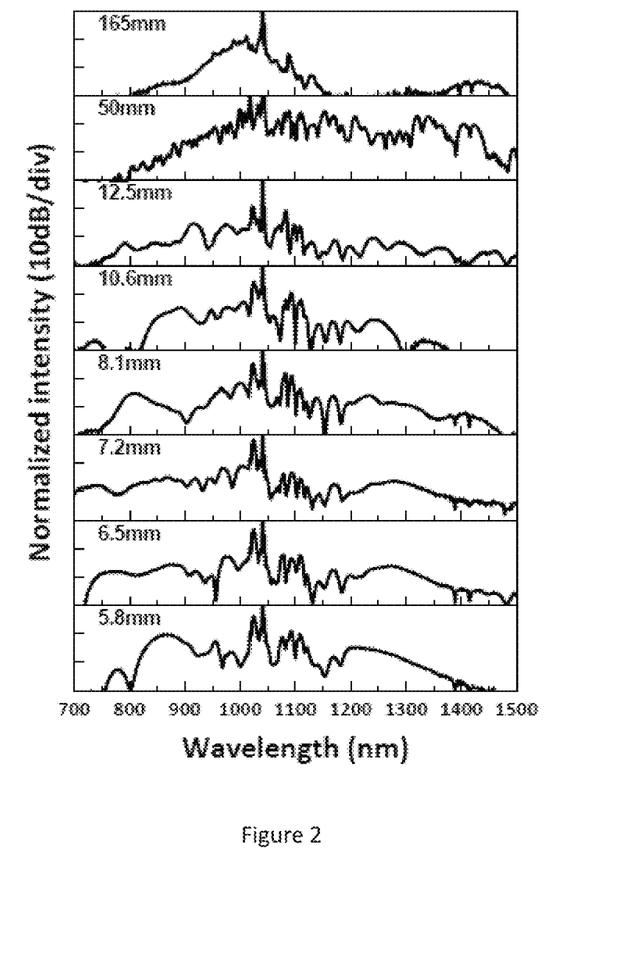
FIG. 2 shows output light spectra of optical fibers of different lengths.

The invention improves the wavelength conversion efficiency by shortening the length of optical fiber. By shortening the length of optical fiber, it is possible to increase the energy of Cherenkov radiation while limiting the blue shift wavelength within the desired range. At the same time, it can also reduce the material absorption and attenuation caused by the optical fiber, thereby improving the wavelength energy conversion efficiency. The present invention provides a device for improving laser wavelength conversion efficiency, which comprises a wavelength conversion member photonic crystal fiber (PCF), and improves wavelength conversion efficiency by shortening the length of the PCF. FIG. 2 shows output spectra of the device for improving laser wavelength conversion efficiency. Each sub-graph in FIG. 2 adopts the same incident power, polarization and pulse width. In FIG. 2, the horizontal axis is the wavelength, and the vertical axis is the normalized logarithmic relative intensity. As can be seen from FIG. 2, when the fiber length is too long (50 mm, 165 mm), the energy of Cherenkov radiation in a specific wavelength range (750-1000 nm) will decrease as the fiber length increases.

Figure 3:
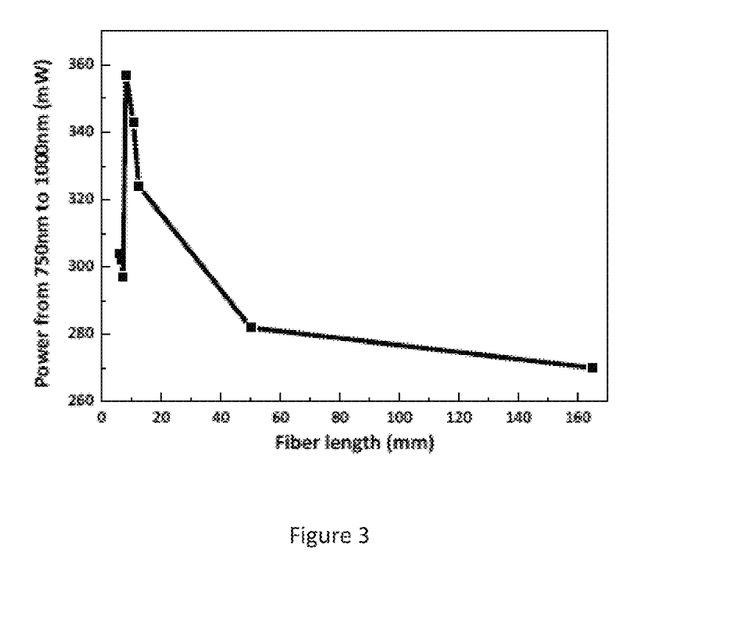
FIG. 3 shows output light powers of optical fibers of different lengths.

FIG. 3 shows the relationship between fiber length and power, where the horizontal axis is the fiber length, and the vertical axis is the average power in the wavelength range of 750-1000 nm. As can be seen in this Figure, when the fiber length is too long, the power in a specific wavelength range is significantly reduced due to the excessive blue shift effect of Cherenkov radiation and the material absorption and attenuation caused by the fiber; and when the fiber length is shortened to be short enough (≤12.5 mm), more energy can be limited to the desired wavelength range.

Combining FIGS. 2 and 3, it can be seen that using the device for improving laser wavelength conversion efficiency of the present invention, by shortening the length of the optical fiber to increase the energy conversion efficiency, the length of the optical fiber is shortened to the centimeter scale, which not only reduces the attenuation and dispersion caused by the optical fiber, but also improves the energy conversion efficiency within a specific wavelength range. The use of the device not only increases the energy of light pulse, but also greatly reduces the amount of fiber used, and can maximize the energy of the desired wavelength according to experimental requirements when using laser input sources of different wavelengths.

Figure 4:
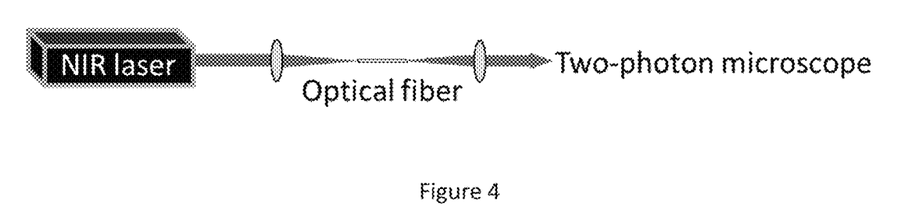
FIG. 4 is a schematic diagram of the laser system of the present invention.

The present invention also provides a laser system configured to provide high-power multi-wavelength femtosecond laser pulses. FIG. 4 is a schematic diagram of the laser system configured to provide high-power multi-wavelength femtosecond laser pulses of the present invention. As can be seen from FIG. 4, the laser system comprises a near-infrared laser (NIR laser), a first lens, an optical fiber and a second lens. The NIR laser is used to generate laser pulses. The first lens is used for focusing the laser pulses generated by the NIR laser and coupling the laser pulses into the optical fiber. The optical fiber is used to broaden the wavelength window of the laser pulses transmitted inside it through SSFS and Cherenkov radiation, and to obtain light in three different wavelength ranges. The second lens is used to convert the multi-wavelength light output from the optical fiber into parallel light, and to output the parallel light.

In the present invention, the NIR laser is a Yb:fiber laser with a center wavelength of 1070 nm, wherein the power of the NIR laser can be adjusted. The optical fiber is a short photonic crystal fiber (PCF), where the fiber length is less than 1 cm, and the zero dispersion wavelength (ZDW) of the PCF is 1040±10 nm. First, the output of a near-infrared femtosecond Yb:fiber laser with a center wavelength of 1070 nm was focused into a short PCF through a lens, and strong nonlinear effects were easily induced due to the high peak power pump and the nonlinear coefficient of the PCF. With proper selection of the negative dispersion at 1070 nm, soliton self-frequency shift (SSFS) or Cherenkov radiation, a three-color supercontinuum spectrum is created in the wavelength range of 800 nm to 1400 nm, with high average power light emitted at the exit of the PCF, thus the laser system could be ideal as a three-color excitation source for multiphoton microscope.

Figure 5A:
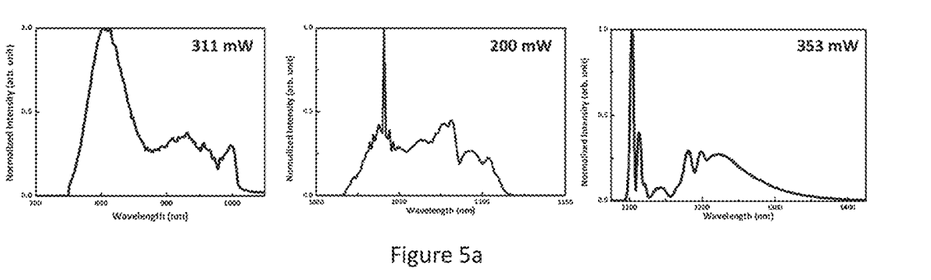
FIG. 5a and FIG. 5b show output spectra and pulse shapes at a fiber length of 6.5 mm, respectively.
Figure 5B:
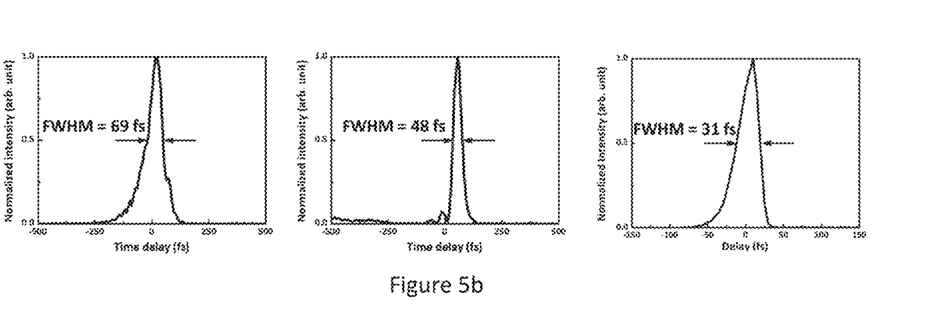

FIG. 5a and FIG. 5b show output spectra and pulse shapes when the length of the PCF is 6.5 mm, respectively. It can be seen from FIG. 5 that for Cherenkov radiation, the wavelength range is 750 nm-1000 nm, the power is 311 mW, and the pulse duration is 69 fs; for negative dispersion at 1070 nm, the wavelength range is 1000-1100 nm, the power is 200 mW, and the pulse duration is 48 fs; and for soliton self-frequency shift, the wavelength range is 1100-1400, the power is 353 mW, and the pulse duration is 31 fs. Three-color supercontinuum spectra were created in the range of 750-1000 nm, 1000-1100 nm and 1150-1400 nm with a combined average power near 1 W. The region 750-1000 nm may be applied to various fluorescent protein-labeled biological samples that emit visible light, e.g., Brainbow-labeled samples for brain neuroscience study. Therefore, the laser system will serve as a convenient light source for multi-fluorophore excitation in two-photon fluorescence microscopy for synchronously observing labelled or transgenic bio-sample and tissue structure. The output of the laser system has the characteristics of high energy conversion efficiency, high pulse energy and short pulse duration.

Figure 6:
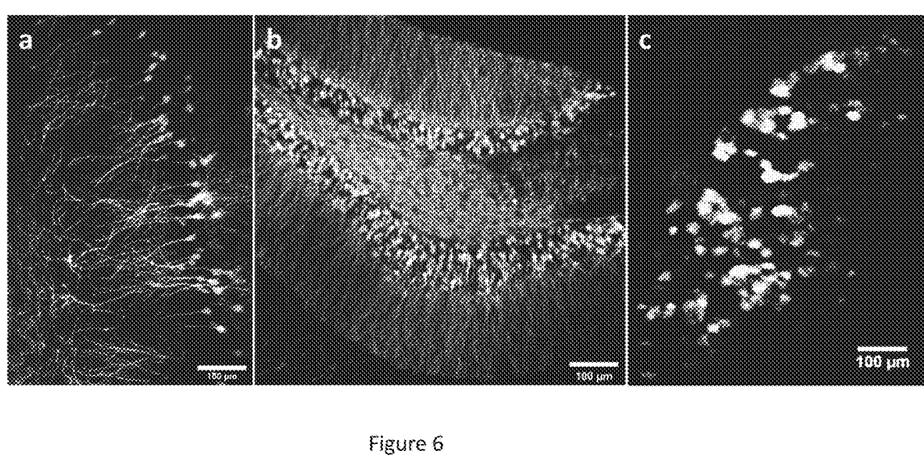
FIG. 6 shows pictures of the multi-wavelength laser generated in FIG. 5 used to excite different proteins.

FIG. 6 shows pictures of the multi-wavelength laser used to excite different proteins in two-photon microscope. For fluorescent protein Thy1-GFP (FIG. 6a) and fluorescent dye Alexa Fluor 546 (FIG. 6b), the excitation wavelength is 750-1000 nm, and the detection wavelength is 500-550 nm and 560-600 nm, respectively. For fluorescent protein tdTomato (FIG. 6c), the excitation wavelength is 1020-1120 nm, and the detection wavelength is 560-610 nm. It can be seen from FIG. 6 that using the high-power multi-wavelength laser system as the source in two-photon fluorescence microscopy, the fluorescent proteins Thy1-GFP and tdTomato, and the fluorescent dye Alexa Fluor 546 can be successfully detected. Using the high-power laser source of the invention, we have successfully developed a multi-color excitation femtosecond laser system with high energy conversion efficiency, which can be used in two-photon microscopes. In addition, wavelength windows of 750-1000 nm and 1000-1100 nm are applicable to excite fluorescent indicators.

The laser system configured to provide high-power multi-wavelength femtosecond laser pulses in the present invention has the following advantages. Firstly, the dispersion caused by the short fiber is weak, so the system can output ultra-short pulse laser (<100 fs) without additional components to compensate for dispersion. Secondly, the wavelength range of Cherenkov radiation can be controlled to be near-infrared, which facilitates the application of the system in multiphoton and makes the microscopes easier to obtain deep biological images. Thirdly, fiber consumption can be significantly reduced by using short fiber in the laser system.

Figure 7:
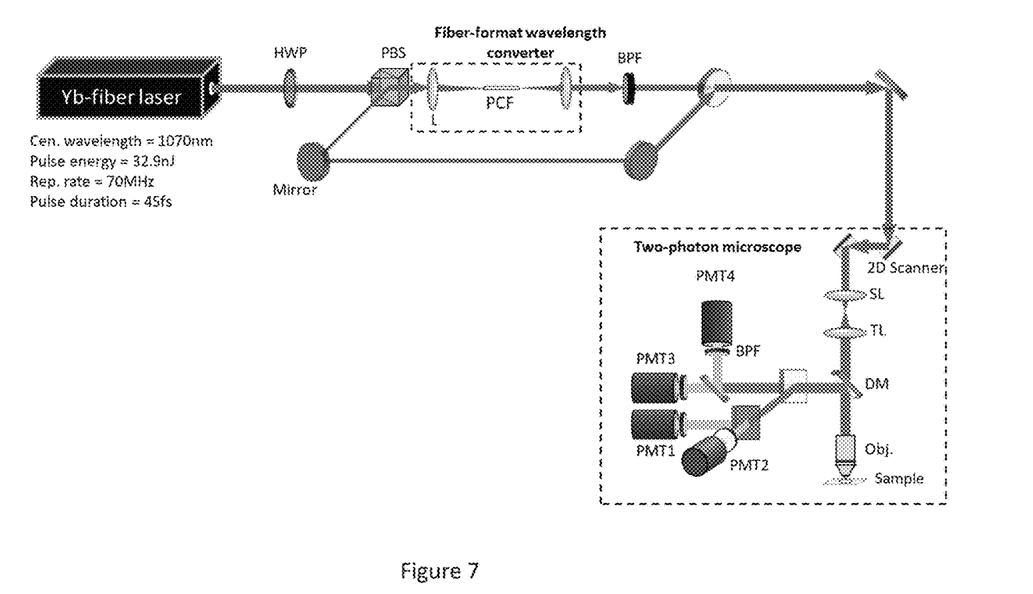
FIG. 7 is a schematic diagram of the laser system of the present invention used in a two-photon microscope.

FIG. 7 is a schematic diagram of the laser system of the present invention used in a two-photon microscope. In FIG. 7, the system comprises a Yb:fiber laser, a HWP (Half-Wave Plate), a PBS (Polarizing beam splitter), a first lens, a PCF (Photonic Crystal Fiber), a second lens, a BPF (Band-Pass Filter) and a two-photon microscope. The Yb:fiber laser is used to generate laser pulses. The HWP is used to adjust the polarization direction of the laser pulses generated by the Yb:fiber laser. The PBS is used to allow p-polarized light transmitting and s-polarized light reflecting to achieve power regulation. The first lens is used for focusing the linearly polarized light and coupling the light into the PCF. The PCF is used to broaden the wavelength window of the laser light transmitted inside it through SSFS and Cherenkov radiation, and to obtain light in three different wavelength ranges. The second lens is used to convert the multi-wavelength light output from the PCF into parallel light, and to output the parallel light. The band-pass filter is used to filter the light output from the second lens to output light of specific wavelength window. The two-photon microscope is used to measure bio-samples and tissue structures using the light output from the band-pass filter, where the laser system serves as a convenient light source in the two-photon microscope. As can be seen from FIG. 6, the high-power multi-wavelength femtosecond laser system in the present invention is an ideal light source for two-photon microscope, and a variety of labelled bio-samples or tissue structures can be observed synchronously.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A laser system configured to provide high-power multi-wavelength femtosecond laser pulses using a device for improving laser wavelength conversion efficiency, comprising a NIR laser, a first lens, a photonic crystal fiber (PCF) and a second lens, the device for improving laser wavelength conversion efficiency comprises a wavelength conversion member photonic crystal fiber (PCF);

the device for improving laser wavelength conversion efficiency improves wavelength conversion efficiency by shortening the length of the PCF; wherein:

the NIR laser is used to generate laser pulses;

the first lens is used for focusing the laser pulses generated by the NIR laser and coupling the laser pulses into the PCF;

the PCF is used to broaden the wavelength window of the laser pulses transmitted inside it through Soliton self-frequency shift (SSFS) and Cherenkov radiation, and to obtain light in three different wavelength ranges; the length of the PCF $L_{PCF}$ is $\leq 1.25$ cm;

the second lens is used to convert the multi-wavelength light output from the PCF into parallel light, and to output the parallel light, the NIR laser is a Yb-fiber laser with a center wavelength of 1070 nm, the wavelength range of Cherenkov radiation is 750-1000 nm, the wavelength range of the negative dispersion of laser pulses generated by the NIR laser at 1070 nm is 1000-1100 nm, and the wavelength range of SSFS is 1100-1400 nm.

2. The laser system according to claim 1, wherein the length range of the PCF is 0.65 cm$\leq L_{PCF} \leq$1.25 cm.

3. The laser system according to claim 1, wherein the laser system further comprises a HWP and a PBS (polarizing beam splitter), the HWP is used to adjust the polarization direction of the laser pulses generated by the NIR laser; the PBS is used to allow p-polarized light transmitting and s-polarized light reflecting to achieve power regulation.

4. The laser system according to claim 3, wherein the laser system further comprises a band-pass filter, and the band-pass filter is used to filter the light output from the second lens to output light of specific wavelength window.

5. The laser system according to claim 4, wherein the laser system is used as an input light source of a two-photon microscope.

* * * * *